United States Patent [19]

Nakajima et al.

[11] Patent Number: 4,767,486

[45] Date of Patent: Aug. 30, 1988

[54] METHOD OF MANUFACTURING AN ELECTROSTATIC CAPACITANCE TYPE INFORMATION SIGNAL RECORDING MEDIUM

[75] Inventors: Hiroshi Nakajima, Zama; Yoshihito Nakane, Yokohama; Toshikazu Goshima, Sagamihara; Osamu Narita, Yokohama; Koji Akita, Yokohama, all of Japan

[73] Assignee: Victor Company of Japan, Ltd., Kanagawa, Japan

[21] Appl. No.: 922,815

[22] Filed: Oct. 20, 1986

Related U.S. Application Data

[63] Continuation of Ser. No. 686,156, Dec. 26, 1984, abandoned.

[30] Foreign Application Priority Data

Dec. 30, 1983 [JP]   Japan ................................ 58-246611

[51] Int. Cl.$^4$ ............................................. B32B 31/00
[52] U.S. Cl. .......................... 156/244.11; 156/244.19; 156/244.24; 156/245; 156/267; 264/107; 425/810
[58] Field of Search ...................... 156/244.11, 244.18, 156/244.19, 244.23, 245, 250, 267, 244.24; 264/107; 369/286; 425/810

[56] References Cited

U.S. PATENT DOCUMENTS

| | | | |
|---|---|---|---|
| 3,535,182 | 10/1970 | Meier-Maletz | 369/286 |
| 4,270,965 | 6/1981 | Torterotot et al. | 156/244.11 |
| 4,315,878 | 2/1982 | Van Dover et al. | 156/244.24 |
| 4,389,441 | 6/1983 | Datta et al. | 369/286 |
| 4,414,660 | 11/1983 | Wang et al. | 369/286 |

FOREIGN PATENT DOCUMENTS 58-55224  4/1983  Japan .

Primary Examiner—Jay H. Woo
Assistant Examiner—Timothy W. Heitbrink
Attorney, Agent, or Firm—Ladas & Parry

[57] ABSTRACT

An electrostatic capacitance type information signal recording disc comprises a laminated plate made up of a first sheet which is made from an inexpensive conductive or non-conductive material and is used as a core material and a second sheet which is made from a conductive material and is bound on at least one surface of the first sheet, and variations in geometrical configuration formed on the second sheet in accordance with information signals which are to be recorded. A method of manufacturing the disc comprises the steps of binding the second sheet on at least one surface of the first sheet so as to obtain a laminated sheet, cutting the laminated sheet into a plurality of laminated plates having a predetermined size, and compression molding the variations in geometrical configuration, in accordance with information signals which are to be recorded, on a recording part of the second sheet of each of the laminated plates supplied in succession.

10 Claims, 2 Drawing Sheets

METHOD OF MANUFACTURING AN ELECTROSTATIC CAPACITANCE TYPE INFORMATION SIGNAL RECORDING MEDIUM

This is a continuation of application Ser. No. 686,156 filed on Dec. 26, 1984, now abandoned.

BACKGROUND OF THE INVENTION

The present invention generally relates to electrostatic capacitance type information signal recording discs and methods of manufacturing the electrostatic capacitance type information signal recording discs, and more particularly to an electrostatic capacitance type information signal recording disc to be played on a reproducing apparatus which reproduces recorded information signals as variations in electrostatic capacitance between the disc and an electrode of a reproducing stylus, and to a method of manufacturing such an electrostatic type information signal recording disc.

Recently, a system has been reduced to practice wherein a reproducing apparatus reproduces recorded information signals from an electrostatic capacitance type information signal recording disc. The information signals are recorded on the disc as variations in geometrical configuration such as formation of pits. The reproducing apparatus reproduces the recorded information signals from the disc as variations in electrostatic capacitance between the disc and an electrode of a reproducing stylus. This type of disc is used as a video disc which is recorded with video signals, an audio disc which is recorded with audio signals, and the like. In a certain kind of the audio disc, the disc is recorded with video signals related to still pictures in addition to the audio signals.

In any kind of electrostatic capacitance type information signal recording disc, a part of the disc containing the variations in geometrical configuration functions as an electrode which forms the electrostatic capacitance between the electrode of the reproducing stylus. Thus, this part of the disc is made of a conductive material. The conventional electrostatic capacitance type information signal recording disc is formed by heating and pressing, by use of stampers, a conductive resin composition which is obtained by admixing a conductive material such as carbon black powder into polyvinyl chloride resins.

However, according to the conventional electrostatic capacitance type information signal recording disc, the entire disc is formed from the conductive resin. Hence, even the central part of the disc in the thickness direction thereof which does not contribute to the signal reproduction, is formed from the conductive resin. But as is well known, the carbon black powder is relatively expensive, and the conductive resin is accordingly expensive. Therefore, the conventional disc which is formed from the conductive resin in its entirety is expensive, and there is a disadvantage in that no measures can be taken to reduce the manufacturing cost of the disc because the conductive resin is expensive.

When manufacturing the conventional disc, a tablet which is made of a conductive resin and has a size such that the diameter thereof is approximately ⅓ the diameter of the disc is prepared. This tablet is heated and pressed by a pair of stampers and is then rolled, so as to obtain a disc having a predetermined thickness and having the variations in geometrical configurations formed on the surface thereof. However, when the tablet (conductive resin) is heated and pressed by the stampers and rolled, the conductive resin is spread between the stampers. Hence, the stamping surfaces of the stampers are easily damaged by the spreading conductive resin which rubs the stamping surfaces. As a result, there is a disadvantage in that the serviceable life of the stampers is short.

In addition, it takes a certain time to prepare the tablet, and there is a disadvantage in that it is difficult to reduce the disc manufacturing cycle. Furthermore, in order to prepare uniform tablets, it is necessary to adjust a tablet forming apparatus which is provided with respect to each disc pressing (compression molding) apparatus which forms the disc by use of the stampers. Consequently, there is a disadvantage in that a troublesome operation is required to adjust the tablet forming apparatus.

On the other hand, a disc forming method in which the disadvantages described before that the disc is expensive because the entire disc is made from the conductive resin containing the expensive carbon black powder is eliminated, was proposed in a Japanese Laid-Open Patent Application No. 58-55224 (Japanese Patent Application No. 57-154470 filed Sept. 3, 1982). This previously proposed disc forming method comprises the steps of forming sheets which are made from a conductive plastic containing the carbon black, positioning the sheets with respect to the stampers within a metal die which is used for compression molding, placing a core material which is made from a non-conductive plastic and is in the form of a dumpling so that the core material may be subjected to the compression molding between the sheets, and forming a disc having such a sandwich type construction that the surface parts of the disc are conductive and the central part of the disc is non-conductive.

According to the disc forming method proposed in the above Laid-Open Application, the quantity of conductive plastic which is required can be reduced by a quantity corresponding to the core material. Thus, the quantity of conductive plastic and accordingly the quantity of the expensive carbon black which is required to form one disc can be reduced, and there is an advantage in that the manufacturing cost of the disc can be reduced.

However, according to the disc forming method proposed in the above Laid-Open Application, bubbles are easily mixed between the sheet and the core material when the stampers subject the sheets and the core material interposed therebetween to the compression molding so as to obtain the disc. Further, dust particles or the like easily adheres to the core material when supplying the core material between the sheets, and the dust particles or the like are also subjected to the compression molding. In this case, there is a disadvantage in that the bubbles and foreign substances such as the dust particles remain between the sheet and the core material of the disc which is formed by the compression molding. Such a disc contains irregularities on the signal recording surface thereof, and the recorded signals cannot be reproduced in a normal manner at parts of the recording surface containing the irregularities. In addition, when forming the disc by the compression molding, the sheets and the core material must be supplied to the pressing apparatus independently. However, it is difficult to supply the sheets and the core material independently in a satisfactory manner, and the construction of an apparatus for independently supplying the sheets and the core material to the pressing apparatus is complex. Moreover, it takes a certain time to complete the pressing cycle, and there is a disadvantage in that virtually no measure can be taken to reduce the pressing cycle. Further, when the stampers form the disc by the compression molding, the stampers must press and spread the core material indirectly, that is, through the sheets. For this reason, much of the pressing force of the stampers is used up to spread the core material, and there is a disadvantage in that the variations of geometircal configurations such as the formation of pits cannot be formed on the recording surface of the sheet in a satisfactory manner.

SUMMARY OF THE INVENTION

Accordingly, it is a general object of the present invention to provide a novel and useful electrostatic capacitance type information signal recording disc and a method of manufacturing the electrostatic capacitance type information signal recording disc, in which the disadvantages described heretofore are overcome.

Another and more specific object of the present invention is to provide an electrostatic capacitance type information signal recording disc which is formed by preparing a plate member having such a laminated structure that a conductive resin sheet is provided on at least one surface of a core sheet and stamping on the surface of the conductive resin sheet part of the plate member variations in geometrical configuration in accordance with signals to be recorded on the disc, and a method of manufacturing such an electrostatic capacitance type information signal recording disc.

Other objects and further features of the present invention will be apparent from the following detailed description when read in conjunction with the accompanying drawings.

DETAILED DESCRIPTION

Figure 1:
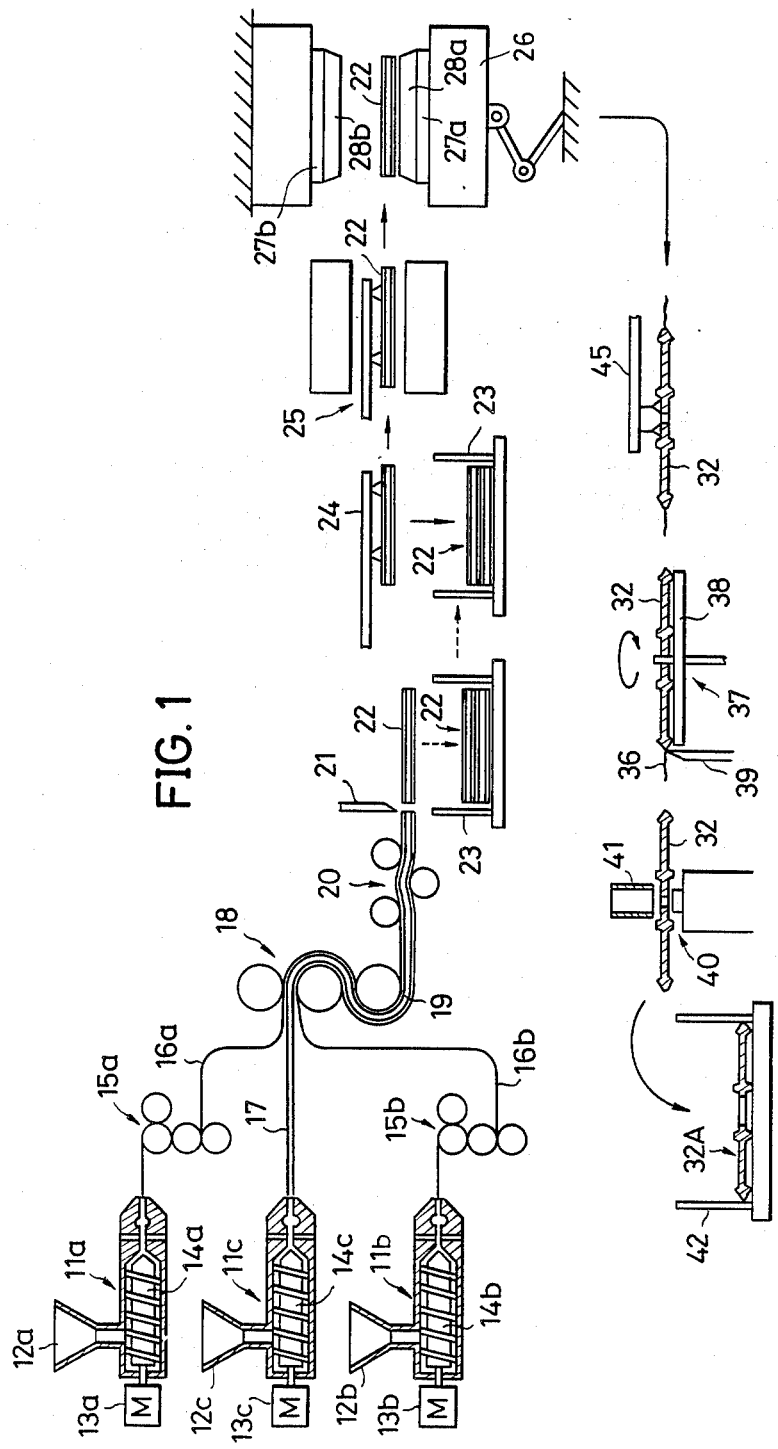
FIG. 1 shows the general construction of an embodiment of a disc manufacturing apparatus for manufacturing an electrostatic capacitance type information signal recording disc by the method according to the present invention.

A description will first be given with respect to an embodiment of the electrostatic capacitance type information signal recording disc (hereinafter simply referred to as a disc) according to the present invention and the method of manufacturing this disc, by referring to an embodiment of a disc manaufacturing apparatus shown in FIG. 1. In FIG. 1, T-die type extruders 11a and 11b comprise respective hoppers 12a and 12b. A lubricant such as silicon oil, additives such as a thermostabilizer and a plasticizer, and a conductive material such as carbon black powder are admixed to polyvinyl chloride resins so as to obtain a conductive plastic, and this conductive plastic is supplied to the hoppers 12a and 12b. The conductive plastic is subjected to an extrusion molding by screw shafts 14a and 14b which are driven by respective motors 13a and 13b. The conductive plastic which is subjected to the extrusion molding, is rolled into conductive plastic sheets 16a and 16b by respective inverted L-shaped calenders 15a and 15b. For example, the conductive resin sheets 16a and 16b each have a thickness of approximately 0.05 mm. The conductive resin sheets 16a and 16b are supplied to a laminator 18.

A T-die type extruder 11c comprises a hopper 12c. A lubricant such as silicon oil and additives such as a thermostabilizer and a plasticizer are admixed to polyvinyl chloride resins so as to obtain a non-conductive plastic, and this non-conductive plastic is supplied to the hopper 12c. Alternatively, the hopper 12c is supplied with an inexpensive conductive plastic which is obtained by admixing to the polyvinyl chloride resins the additives described before and a conductive material (inexpensive carbon black) which is less expensive than the conductive material used for the conductive plastic sheets 16a and 16b, metal particles, a surface active agent which is generally used as an antistatic agent, or metallic salt. The non-conductive plastic or the inexpensive conductive plastic is subjected to an extrusion molding by a screw shaft 14c which is driven by a motor 13c and is formed into a sheet 17. The sheet 17 is used as a core material. For example, the sheet 17 has a thickness of approximately 1.15 mm. The sheet 17 is also supplied to the laminator 18.

The laminator 18 comprises a pair of heating rollers, and the sheets 16a, 16b, and 17 are passed between these rollers. As the sheets 16a, 16b, and 17 are passed between the rollers of the laminator 18, the sheets 16a and 16b are bound on respective sides of the sheet 17 which is used as the core material by heating and compression. As a result, a laminated sheet 19 having the sheet 17 sandwiched between the sheets 16a and 16b is obtained. The rollers of the laminator 18 heat the sheets 16a, 16b, and 17 up to a termperature of 50° C. to 100° C., for example, and compress the sheets 16a, 16b, and 17 with a pressure of 10 kg/cm², for example. The laminated sheet 19 is fed to a cutter 21 by take-up rollers 20, and is successively cut into square laminated plates 22. For example, one side of each of the laminated plates 22 is equal to 26 cm. The laminated plates 22 are stocked in a stocker 23.

In the embodiment described heretofore, the extruders 11a through 11c are employed as apparatuses for forming the sheets 16a, 16b, and 17. However, it is possible to employ other suitable apparatuses such as calender molding apparatuses and profile extrusion apparatuses. In addition, the sheets 16a, 16b, and 17 need not be formed simultaneously, and for example, the sheets 16a and 16b may be formed by extruders and prepared in the form of rolls in advance. In this case, the sheets 16a and 16b may be paid out from the respective rolls and supplied to the laminator 18 together with the sheet 17 which is obtained from the extruder 11c. Similarly, all of the sheets 16a, 16b, and 17 may be formed by extruders and prepared in the form of rolls in advance, and the sheets 16a, 16b, and 17 may be paid out of each of the three rolls and supplied to the laminator 18.

Figure 2A:
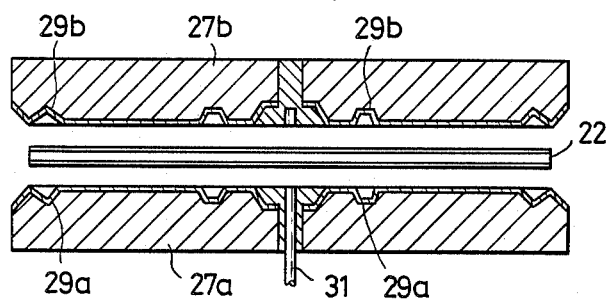
FIGS. 2A and 2B respectively show an essential part of a pressing apparatus in the apparatus shown in FIG. 1, in an enlarged scale, before and after a compression molding takes place.

Next, the laminated plates 22 which are stocked in the stocker 23, are conveyed to a predetermined position in a vicinity of a pressing apparatus according to the needs. A transporting arm 24 picks up one laminated plate 22 at a time by vacuum suction and carries the laminated plate 22 to a pre-heating apparatus 25. The laminated plate 22 is pre-heated by the pre-heating apparatus 25, and the pre-heated laminated plate 22 is then conveyed and placed on top of a stamper 28a which is mounted on a lower metal die 27a. As shown in FIG. 2A, the stamper 28a and a stamper 28b which is mounted on an upper metal die 27b, respectively have depressions 29a and 29b for forming outer and inner track guards, and pit forming parts 30a and 30b for forming track parts (signal recording surfaces) containing signal pits.

Figure 2B:
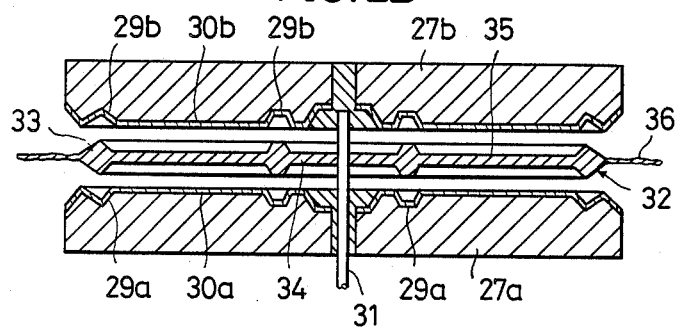

A pressing apparatus 26 heats and compresses the laminated plate 22 by use of the stampers 28a and 28b. The heat compressioin molding in the pressing apparatus 26 is carried out with a pressure of approximatley 140 kg/cm$^2$, for example, and the temperature during the heat compression molding changes between 20° C. and 200° C. in one molding cycle. The maximum temperature reached during the heat compression molding is approximately equal to 200° C., and the temperature falls to approximately 20° C. during the cooling process. After the heat compression molding takes place in the pressing apparatus 26, the metal dies 27a and 27b and the stampers 28a and 28b are respectively separated from each other. As a result, a disc 32 shown in FIG. 2B is formed. During the heat compression molding, a small hole having a diameter of 7.2 mm, for example, is formed at the center of the disc by a center pin 31. An outer track guard 33, an inner track guard 34, and a signal recording part 35 which contains the pits and is provided between the outer and inner track guards 33 and 34, are formed on the disc 32 which is molded in the above described manner. In addition, an overflow part 36 is formed on the outer peripheral edge of the disc 32.

When forming the disc 32, the pressing apparatus 26 merely subjects the laminated plate 22 to the compression molding. Since the laminated plate 22 is already a laminated structure having the sheet 17 sandwiched between the sheets 16a and 16b, bubbles and foreign substances will not mix into the inside of the disc when the compression molding takes place. In addition, because it is sufficient to supply only the laminated plate 22 to the pressing apparatus 26, the construction of the apparatus for transporting the material which is to be pressed to the pressing apparatus is simple, and the construction of the pressing apparatus is also simple. For this reason, the pressing cycle is shortened, and the productivity is improved. Further, when the pressing apparatus 26 subjects the laminated plate 22 to the compression molding, the pressing force of the stampers 28a and 28b is solely used for forming the track guards 33 and 34 and the pits of the signal recording part 35. That is, since the pressing force of the stampers 28a and 28b is not used for spreading a large quantity of plastic as in the conventional case described before, it is possible to satisfactorily form the pits of the signal recording part 35 on the disc.

The disc 32 which is formed in the manner described heretofore, is picked up by a transporting arm 45 under vacuum suction, and is supplied to a trimming apparatus 37 from the pressing apparatus 26. The disc 32 is placed on a turntable 38 and is rotated. A cutter 39 trims and removes the overflow part 36 of the rotating disc 32. Next, a puncher 41 of a center punch apparatus 40 punches a center hole in the disc 32, which center hole has a diameter of 38.2 mm, for example. The disc 32 having the center hole is picked up by the transporting arm 45 and is conveyed to a stocker 42 as a completed disc 32A.

Figure 3:
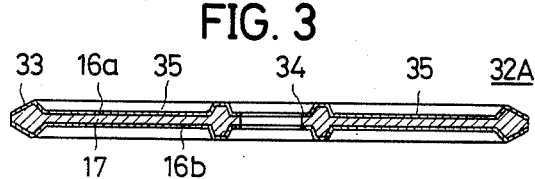
FIG. 3 is a view in a vertical cross section showing an embodiment of the electrostatic capacitance type information signal recording disc manufactured by the apparatus shown in FIG. 1.

FIG. 3 shows the vertical cross section of the disc 32A in an enlarged scale. The disc 32A comprises the compression molded laminated plate 22 having the compression molded conductive plastic sheets 16a and 16b and the sheet 17 which is used as the core material of the disc 32A.

The thickness of the sheets 16a and 16b which are used for the laminated plate 22 if not limited to the value given before. As the thickness of the sheets 16a and 16b is reduced, the quantity of the conductive plastic which is required is accordingly reduced, and as a result, the disc 32A can be manufactured at a lower cost. It has been confirmed that the signal reproducibility is unaffected by the reduced thickness of the sheets 16a and 16b, and it is theoretically possible to reduce the thickness of the sheets 16a and 16b to approximately 0.01 mm, for example.

Although the illustration thereof is omitted, the disc manufacturing apparatus may be constructed as follows in a modification of the embodiment shown in FIG. 1. That is, a pre-pressing apparatus may be provided in a stage prior to the pressing apparatus 26. In this modification, stampers of metal dies of the pre-pressing apparatus respectively comprise depressions which are for forming the outer and inner track guards and are similar to the depressions 29a and 29b of the stampers 28a and 28b. In this pre-pressing apparatus, parts of the stampers corresponding to the pit forming parts 30a and 30b are simply flat surfaces. When the laminated plate 22 is subjected to the compression molding in this pre-pressing apparatus, the pits of the signal recording part are not formed, however, the outer and inner track guards are formed on the laminated plate 22. Further, in this modification, stampers of the pressing apparatus 26 respectively comprise only pit forming parts corresponding to the pit forming parts of the stampers 28a and 28b. Accordingly, when the laminated plate 22 having the outer and inner track guards is subjected to the compression molding in the pressing apparatus 26, the pits of the signal recording part are formed on the laminated plate 22 having the outer and inner track guards, and the disc 32 is obtained as a result.

According to this modification, the number of processes required to manufacture the disc 32A increases by one because the track guards and the pits of the signal recording part are formed in independent processes. However, this means that the pressing apparatus 26 only needs to form the pits of the signal recording part of the disc and not the track guards. Therefore, the pressing force of the stampers of the pressing apparatus 26 is solely used for forming the pits of the signal recording part of the disc, and for this reason, the pits of the signal recording part can be formed with ease in a more satisfactory manner.

In the embodiment and the modification described heretofore, the inexpensive conductive plastic is used for the sheet 17 which is used as the core material of the disc 32A. However, in this case, the disc 32A is conductive in its entirety. For this reason, the disc 32A is grounded through a turntable when the disc 32A is played on a reproducing apparatus, and the static electricity is positively grounded so that no static electricity discharge will take place between the disc 32A and a reproducing stylus of the reproducing apparatus. But in order to even further reduce the manufacturing cost of the disc 32A, the sheet 17 which is used as the core material of the disc 32A may be made from a more inexpensive non-conductive plastic containing no conductive material, paper, or the like. In such a case where the non-conductive material is used as the core material of the disc 32A, one of the conductive plastic sheets 16a and 16b in contact with the reproducing stylus will not be grounded. Accordingly, in such a case, the trimming apparatus 37 may be designed to trim and remove the overflow part 36 while heating the outer peripheral edge part of the disc 32 so that the conductive plastic sheets 16a and 16b are melted and welded together at the outer peripheral edge part of the disc. Since the sheets 16a and 16b are connected at the outer peripheral edge part of such a disc, one of the sheets 16a and 16b in contact with the reproducing stylus will be grounded through the other sheet even though the core material of the disc is non-conductive, and the problem of static electricity is eliminated.

Next, a description will be given with respect to an example of the composition of the material which is used for the conductive plastic sheets 16a and 16b and an example of a method of manufacturing the material. 100 percent by weight of polyvinyl chloride resins (For example, TOSE ACE (Registered Trademark) manufactured by Tokuyama-Sekisui Ind., Co. Ltd. of Japan), 5 percent by weight of dibutil tin mercaptan stabilizer, 2 percent by weight of higher fatty acid lubricant, 0.5 percent by weight of higher fatty ester lubricant, a 1 percent by weight of dimethyl polysiloxane lubricant are thoroughly mixed in a high-speed mixer (for example, a SUPER MIXER manufactured by Kawada Seisakusho Co., Ltd. of Japan). When the temperature in the high-speed mixer reaches 120° C., for example, 20 percent by weight of carbon black (for example, BLACK PEARLS (Registered Trademark) manufactured by Cabot Corporation of the U.S.) is admixed to the mixture in the high-speed mixer, and is again thoroughly mixed. The mixture in the high-speed mixer is then cooled down to 40° C., for example, by cooling the mixer jacket by water. The conductive resin containing the carbon black is removed from the high-speed mixer, and is pelletized by use of a kneading extruder with a screw temperature of 80° C. and a cylinder temperature of 110° C., for example. The pellet is supplied to the hoppers 12a and 12b of the respective extruders 11a and 11b.

Next, a description will be given with respect to an example of the composition of the material which is used to form the sheet 17 and an example of a method of manufacturing the material.

100 percent by weight of polyvinyl chloride homopolymer (for example, SA-1000N manufactured by Sun Arrow Chemicals Co., Ltd.), 3 percent by weight of dibutyl tin mercaptan stabilizer (for example, STANN JF-10B manufactured by Sankyo Yuki Gosei Co., Ltd. of Japan), 0.5 percent by weight of monoglyceride stearate lubricant (for example, S-100 manufactured by Riken Vitamin Oils Co., Ltd.), 0.3 percent by weight of ester wax lubricant (for example, G-71 manufactured by Henkel-Hakusui Corporation of Japan), and 0.3 percent by weight of calcium stearate lubricant are thoroughly mixed in the high-speed mixer at a high speed. When the temperature in the high-speed mixer reaches 120° C., for example, the mixing speed of the high-speed mixer is reduced. Then, the high-speed mixer is cooled down to 40°C., for example, by cooling the mixer jacket by water. The resin is removed from the high-speed mixer, and is kneaded and pelletized by use of an extruder (for example, a uniaxial extruder manufactured by Takayasu Tekkosho Co., Ltd. of Japan). The pellet is supplied to the hopper 12c of the extruder 11c. As another example, it is possible to use another polyvinyl chloride homopolymer (for example, SA-800B manufactured by Sun Arrow Chemicals Co., Ltd. of Japan) instead of the polyvinyl chloride homopolymer described before. Further, it is possible to use acrylate resin (for example, ACRYPET VH (Registered Trademark) manufactured by Mitsubishi Rayon Co., Ltd. of Japan) instead of the polyvinyl chloride homopolymer.

In the embodiment described before, the disc 32 is formed by using the laminated plate 22 having the sheet 17 sandwiched between the conductive plastic sheets 16a and 16b. However, the laminated plate may only have one of the conductive plastic sheets 16a and 16b laminated with respect to the sheet 17. In this case, when the coefficient of contraction differs between the sheet 17 and the one conductive plastic sheet, the laminated plate and the disc formed from this laminated plate will both become warped and it is difficult to obtain a completely flat disc. Accordingly, the material used for the sheet 17 and the material used for the one conductive plastic sheet must have similar coefficients of contraction. In a case where the material of the example described before is used for the one conductive plastic sheet, the sheet 17 may have a composition comprising 100 percent by weight of polyvinyl chloride resins, 2.5 percent by weight of dibutyl metal mercaptan stabilizer, 1 percent by weight of higher fatty acid lubricant, and 0.25 percent by weight of higher fatty ester lubricant, for example.

Further, the present invention is not limited to these embodiments, but various variations and modifications may be made without departing from the scope of the present invention.

What is claimed is:

1. A method of manufacturing an electrostatic capacitance type information signal recording disc, said method comprising the steps of:
    (a) simultaneously but separately extrusion forming first and second sheets, said first sheet being a continuous sheet made of a non-conductive material, said second sheet being a continuous sheet made of a conductive material and having a thickness of approximately 0.01 mm to 0.05 mm;
    (b) binding said second sheet on at least one surface of said first sheet by use of binding means, said binding means comprising heating rollers for heating said first and second sheets up to a predetermined temperature and binding said first and second sheets with a predetermined pressure so as to obtain a continuous laminated sheet, said first sheet being used as a core material and having a thickness which is approximately 100 to 23 times the thickness of said second sheet so that said continuous laminated sheet has a predetermined thickness, said heating rollers being directly supplied with said first and second sheets which are formed in said step (a);
    (c) cutting said laminated sheet into a plurality of laminated plates having a predetermined size which corresponds to the size of said electrostatic capacitance type information signal recording disc;
    (d) pre-heating each of said laminated plates so as to obtain a pre-heated laminated plate; and
    (e) compression molding variations in geometrial configuration, in accordance with information signals which are to be recorded, on a recording part of said second sheet of said pre-heated laminated plate supplied.

2. A method as claimed in claim 1 in which said second sheet comprises a pair of conductive plastic sheets bound on both surfaces of said first sheet.

3. A method as claimed in claim 2 in which said first sheet comprises a non-conductive plastic sheet.

4. A method as claimed in claim 1 in which said first sheet comprises a non-conductive plastic sheet, said second sheet comprises a conductive plastic sheet bound on one surface of said first sheet, and said non-conductive plastic has a coefficient of contraction similar to a coefficient of contraction of said conductive plastic.

5. A method as claimed in claim 1 in which said step (e) comprises the steps of (f) compression molding said pre-heated laminated plate so that said recording part where the information signals are to be recorded is formed into a thin portion, and that outer and inner peripheral parts thereof are formed into relatively thick portions, and (g) compression molding the variations in geometrical configuration in accordance with the information signals which are to be recorded on said recording part of said pre-heated laminated plate subjected to said 6. A method of manufacturing an electrostatic capacitance type information signal recording disc, and method comprising the steps of:
  (a) simultaneously but separately extrusion forming first and second sheets, said first sheet being a continuous sheet made of a conductive material, said second sheet being a continuous sheet made of another conductive material and having a thickness of approximately 0.01 mm to 0.05 mm, said conductive material used for said first sheet being an inexpensive material compared to said other conductive material used for said second sheet;
  (b) binding said second sheet on at least one surface of said first sheet by use of binding means, said binding means comprising heating rollers for heating said first and second sheets up to a predetermined temperature and binding said first and second sheets with a predetermined pressure so as to obtain a continuous laminated sheet, said first sheet being used as a core material and having a thickness which is approximately 100 to 23 times the thickness of said second sheet so that said continuous laminated sheet has a predetermined thickness, said heating rollers being directly supplied with said first and second sheets which are formed in said step (a);
  (c) cutting said laminated sheet into a plurality of laminated plates having a predetermined size which corresponds to the size of said electrostatic capacitance type information signal recording disc;
  (d) pre-heating each of said laminated plates so as to obtain a pre-heated laminated plate; and
  (e) compression molding variations in geometrial configuration, in accordance with information signals which are to be recorded, on a recording part of said second sheet of said pre-heated laminated plate supplied.

7. A method as claimed in claim 6 in which said second sheet comprises a pair of conductive plastic sheets bound on both surfaces of said first sheet.

8. A method as claimed in claim 7 in which said first sheet comprises a conductive plastic sheet.

9. A method as claimed in claim 6 in which said first sheet comprises a conductive plastic sheet, said second sheet comprises a conductive plastic sheet bound on one surface of said first sheet, and the conductive plastic used for said first sheet has a coefficient of contraction similar to a coefficient of contraction of the conductive plastic used for said second sheet.

10. A method as claimed in claim 6 in which said step (e) comprises the steps of (f) compression molding said laminated plate so that said recording part where the information signals are to be recorded is formed into a thin portion, and that outer and inner peripheral parts thereof are formed into relatively thick portions, and (g) compression molding the variations in geometrical configuration in accordance with the information signals which are to be recorded on said recording part of said pre-heated laminated plate subjected to said step (d).

* * * * *